United States Patent [19]

Benantar et al.

[11] Patent Number: 5,787,427

[45] Date of Patent: Jul. 28, 1998

[54] INFORMATION HANDLING SYSTEM, METHOD, AND ARTICLE OF MANUFACTURE FOR EFFICIENT OBJECT SECURITY PROCESSING BY GROUPING OBJECTS SHARING COMMON CONTROL ACCESS POLICIES

[75] Inventors: Messaoud Benantar, Poughkeepsie, N.Y.; George Robert Blakley, III; Anthony Joseph Nadalin, both of Austin, Tex.

[73] Assignee: International Business Machines Corporation, Armonk, N.Y.

[21] Appl. No.: 582,270

[22] Filed: Jan. 3, 1996

[51] Int. Cl.[6] ............................................. G06F 12/14
[52] U.S. Cl. ........................... 707/9; 707/10; 707/103; 395/187.01; 395/200.55; 395/200.59; 380/25
[58] Field of Search ............................ 395/609, 601, 395/610, 187.01, 200.55, 200.59; 707/9, 103, 10; 380/25

[56] References Cited

U.S. PATENT DOCUMENTS

| | | | |
|---|---|---|---|
| 4,525,780 | 6/1985 | Bratt et al. | 711/163 |
| 5,136,712 | 8/1992 | Perazzoli, Jr. et al. | 395/674 |
| 5,173,939 | 12/1992 | Abadi et al. | 380/25 |
| 5,187,790 | 2/1993 | East et al. | 395/684 |
| 5,265,221 | 11/1993 | Miller | 395/725 |
| 5,283,830 | 2/1994 | Hinsley et al. | 380/25 |
| 5,297,283 | 3/1994 | Kelly, Jr. et al. | 395/650 |
| 5,315,657 | 5/1994 | Abadi et al. | 380/25 |
| 5,321,841 | 6/1994 | East et al. | 395/725 |
| 5,335,346 | 8/1994 | Fabbio | 395/600 |
| 5,450,593 | 9/1995 | Howell et al. | 395/650 |
| 5,524,238 | 6/1996 | Miller et al. | 395/600 |
| 5,598,562 | 1/1997 | Cutler et al. | 395/674 |
| 5,677,851 | 10/1997 | Kingdon et al. | 395/200.59 |
| 5,701,458 | 12/1997 | Bsaibes et al. | 1/1 |

*Primary Examiner*—Thomas G. Black
*Assistant Examiner*—Jean R. Homere
*Attorney, Agent, or Firm*—Jenkins & Gilchrist; Mark S. Walker

[57] ABSTRACT

A system, method and article of manufacture, for improving object security in an object oriented system, includes one or more processors, a memory system, one or more I/O controllers, each controlling one or more I/O devices, a bus connecting the processors, the memory system and the I/O controllers, an operating system controlling operation of the processors, the memory system and the I/O controllers, and an object oriented control means which includes means for grouping objects which share common access control policies, where an access control list becomes associated with each object group and the policy applicable to the members of the group. An object may be part of multiple groups, and based upon an environment's policy, granting access to the object may be based on a single default object group or on the access granted by the union of all of its object groups.

12 Claims, 3 Drawing Sheets

| | OBJGRP1 | OBJGRP2 |
|---|---|---|
| ALICE | READ, WRITE, EXECUTE | USE, ADMINISTER, CONTROL |
| PROGRAMMERS | EXECUTE | USE, CONTROL |
| GUEST | READ | USE |

FIG. 1
PRIOR ART

| ALICE | READ, WRITE, EXECUTE |
|-------|----------------------|
| BOB   | USE, OPERATE         |
| CATHY | ADMINISTER           |
| ....  | ..............       |
| TERRY | CREATE, EXECUTE      |

ACL FOR OBJECT1

FIG. 5

|             | OBJGRP1              | OBJGRP2                  |
|-------------|----------------------|--------------------------|
| ALICE       | READ, WRITE, EXECUTE | USE, ADMINISTER, CONTROL |
| PROGRAMMERS | EXECUTE              | USE, CONTROL             |
| GUEST       | READ                 | USE                      | ial
INFORMATION HANDLING SYSTEM, METHOD, AND ARTICLE OF MANUFACTURE FOR EFFICIENT OBJECT SECURITY PROCESSING BY GROUPING OBJECTS SHARING COMMON CONTROL ACCESS POLICIES

TECHNICAL FIELD OF THE INVENTION

The present invention relates to information handling systems, methods and articles of manufacture, and more particularly to information handling systems, methods and articles of manufacture for enhancing object security processing in an object oriented system.

BACKGROUND OF THE INVENTION

There is a need to improve security in object oriented systems. The nature of object oriented systems dictates that access control be performed at the object level while permissions required for access are mapped to a method level. That is, permissions control what method a subject is able to invoke on what object. This results in requiring access control lists (ACL) to associate with protected objects in ACL based protection mechanisms.

Such a PRIOR ART access control list is shown in FIG. 1. A typical object oriented system is likely to have a very large number of objects. This would create a large number of access control lists which would result in a large amount of storage being required for the ACLs. Also, managing the large number of ACLs becomes a cumbersome task for application developers and for security system administrators.

PRIOR ART

In the prior art there are many techniques for improving object oriented programming systems (OOPS).

The following are examples of the prior art.

U.S. Pat. No. 4,525,780 teaches a data processing system having a memory organized into objects, where the system uses a protection technique to prevent unauthorized access to objects by users which are identified by a subject number identifying the user, a process for executing a user's procedure and the type of system operation to be performed by the user's procedure. An access control list is maintained to control access to objects based on subject identifier.

U.S. Pat. No. 5,136,712 teaches an object based operating system for a multitasking computer system including means for making an object private to a process. Access to a private object is controlled by an access control list.

U.S. Pat. No. 5,265,221 teaches an access control mechanism for granting, revoking, and denying authorization to objects using a system of verbs, parameters, attributes and functions.

U.S. Pat. Nos. 5,297,283 and 5,321,841 appear to teach the same system as U.S. Pat. No. 5,136,712 discussed above.

U.S. Pat. No. 5,093,914 generally teaches a method used by a digital computer in controlling execution of an object oriented program to effect a defined action, for example, stopping the program when a specified virtual function is invoked on a specified object during execution of the program.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patents generally deal with methods for protecting access to objects in object oriented programs, the patents do not teach nor suggest grouping objects sharing common access control policies as is taught and claimed herein with reference with the present invention.

There is a need to automatically add object services features, for example, persistence, recoverability, concurrency and security to a binary class. A related copending patent application Serial No. 08/537,648, filed Oct. 2, 1995 teaches and claims automatically inserting object services into binary classes in an object oriented system. The teaching of U.S. patent application Serial No. 08/537,647 are incorporated by reference herein. Sometimes the source code of a class is not available for modification. Even when the source code is available, a considerable reprogramming effort is required to add the object services features.

SUMMARY OF THE INVENTION

It is an object of the present invention to improve object security in an object oriented system by grouping objects sharing common access control policies.

Accordingly, a system, method and article of manufacture, for improving object security in an object oriented system, includes one or more processors, a memory system, one or more I/O controllers, each controlling one or more I/O devices, a bus connecting the processors, the memory system and the I/O controllers, an operating system controlling operation of the processors, the memory system and the I/O controllers, and an object oriented control means which includes means for grouping objects which share common access control policies, where an access control list becomes associated with each object group and the policy applicable to the members of the group. An object may be part of multiple groups, and based upon an environment's policy, granting access to the object may be based on a single default object group or on the access granted by the union of all of its object groups.

It is an advantage of the present invention that object security in object oriented systems is improved by grouping objects sharing common access control policies.

BRIEF DESCRIPTION OF THE DRAWINGS

FIG. 1 is a block diagram of a prior art access control list in an access control list based object projection mechanism.

FIG. 5 is a block diagram of object groups, each containing objects sharing common access control policies, according to the present invention.

DETAILED DESCRIPTION OF A PREFERRED EMBODIMENT OF THE INVENTION

Figure 2:
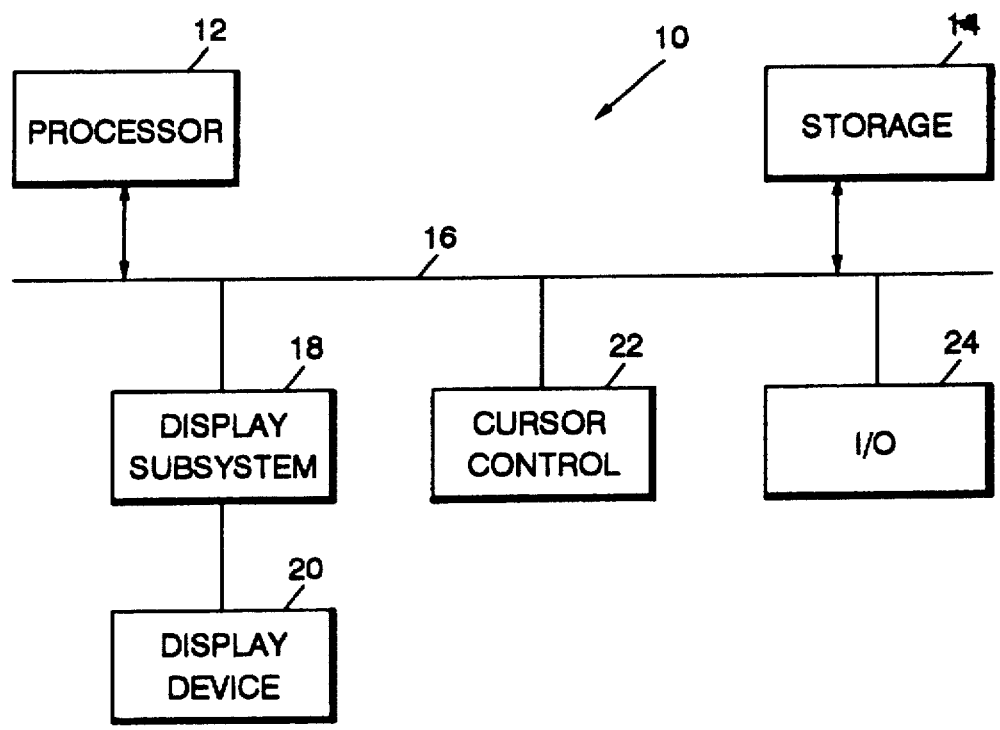
FIG. 2 is a block diagram of an information handling system embodying the present invention.
Figure 3:
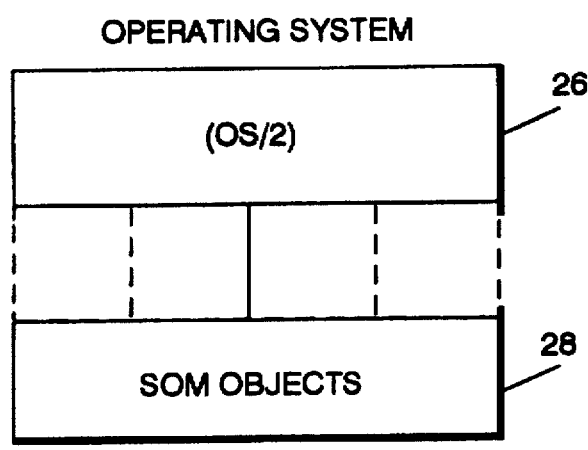
FIG. 3 is a block diagram showing the operating system platform and system object model program supporting the present invention.

Referring now to FIGS. 2 and 3, on information handling system 10 and an operating system environment for the present invention will be described.

Information handling system 10 may be a graphics work station or the like with one or more processors 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multitasking operating system such as OS/2* (OS/2 is a registered trademark of International Business Machines Corporation). Among many tasks which the OS/2 operating system controls in operating information handling system 10, is execution of an object oriented program, such as, DSOM Objects program, which is a commercially available product of International Business Machines Corporation.

The method of the present invention may be incorporated in the DSOMObjects program.

In accordance with the present invention, access control to objects of a binary class are provided by the Object Security Service (OSS). The OSS according to the present invention will be described.

An access matrix represents the authorization policy of a system in which a set of named "subjects" (e.g., users) are granted "rights" (e.g., "read," "write," "execute") to perform operations on a set of "objects." The access matrix describes the system's policy by labeling the rows of the matrix with the names of the subjects, labeling the columns of the matrix with the names of the objects, and filling each cell of the matrix with the rights of one subject (the one named by the cell's row label) to one object (the one named by the cell's column label). The resulting matrix is shown in Table 1.

TABLE 1

The Access Matrix

|   |     |     |   |     |
|---|-----|-----|---|-----|
|   | rwx | rw- |   | r-- |
|   | r-- | r-- |   | --- |
|   | r-- | r-- |   | --- |
|   | rwx | --- |   | -w- |

Few information systems implement access matrices as monolithic data structures, for reasons which will be discussed below. Instead, most systems break the authorization information into pieces and store the pieces either with subject definition data structures or with object data structures.

Systems which store their authorization information in subject definition data structures are called "capability-based." Capability-based systems store each subject's row of the authorization matrix in the subject's definition data structure; the row is called a "capability" because it describes which operations the subject is capable of (allowed to) perform on each object in the system. Subject bob's capability (derived from the above authorization matrix) is shown in Table 2.

TABLE 2 bob's Capability (implemented in OSS)

| obj_1 | obj_2 | --- | obj_n |
|-------|-------|-----|-------|
| r--   | r--   |     | ---   |

Systems which store their authorization information in object data structures are called "ACL-based" (ACL means "Access Control List"). ACL-based systems store each object's column of the authorization matrix in the object's data structure; the row is called an "Access Control List" because it lists the subjects and the operations each of them is permitted to perform ("access") on the object. Object obj_1's ACL is shown in Table 3.

TABLE 3 obj_1's ACL

| alice | rxw |
|-------|-----|
| bob   | r-- |
| cathy | r-- |
| ---   |     |
| zeke  | rwx |

In many modern processing environments, storing this table in a single data structure and using it to manage and check access control is impractical because of issues of scale. Two problems which arise very frequently are:

1. there are too many subjects
2. there are too many objects

There are several common approaches to dealing with these problems.

The first approach is to observe that some subjects will never even ask for access to some objects; it is not necessary to store an access control policy for entries in the matrix corresponding to these (subject, object) pairs. Therefore, it is possible to implement a "sparse" matrix which contains only entries for "reasonable" (subject, object) pairs. Most capability-based systems take this approach, by including only "relevant" objects in users' capabilities. Without this artifice, user registry databases in capability-based systems would become unmaintainably large.

A second approach is to break the matrix into several pieces and store the pieces separately. This approach is taken by many access control list (ACL)-based systems. ACLs are typically stored either with the resources they protect (in which case the table is broken up into a set of individual columns, with one column stored with each resource) or in ACL managers associated with resource management servers (in this case, all the columns protecting the objects "owned" by a resource management server are stored in the ACL manager associated with that server).

A third approach to the problem of scale and its effects on the size of the authorization matrices to reduce the number of rows in the matrix by building an auxiliary table (see Table 4) which aggregates users into new subject entries called "groups."

TABLE 4

Group Membership Table (implemented in OSS)

| users      | group          |
|------------|----------------|
| bob, cathy | programmers    |
| zeke       | administrators |

The use of groups allows administrators to manage many fewer subject entries, since most users are "ordinary" and can get their authorizations from their group entries in the matrix. In a well-administered system, there will be only a few groups (maybe one or two per department, plus a few cross-department groups, for example), and only a few "extraordinary" users will need special authority which will require their user identities to have subject rows in the matrix. Given the group definitions in Table 4, the access matrix can be simplified as shown in Table 5.

TABLE 5

Access Matrix (with User Groups)

|  |  |  |  |  |  |
|---|---|---|---|---|---|
|  | rwx | rw- |  |  | r-- |
|  | r-- | r-- |  |  | --- |
|  | rwx | --- |  |  | -w- |

The way the user specifies security is to specify the following constraints when searching for a class object:

name: secure value: A boolean indicating whether the object is protected by access control checking.

name: ACL value: If secure=TRUE, an access control list.

When granularity is per method, enforcement can be done either per method invocation or when a reference is first obtained (the capability approach). The capability approach can be implemented by building a security proxy object in the server for each combination of object and ACL (list of allowed methods) that has only the subset of methods that are allowed. The ORB (or at least the server object) would have to be modified to do this.

An approach to the problem of scale is to group objects as well as subjects. The OSS authorization architecture permits formation of object groups, which are called "access control factors" or Object Groups. Each controlled object in an OSS system must be a member of at least one Object Group in the OSS authorization matrix (i.e., all the column labels of the matrix are Object Group names). If an object instance (object-oriented programming terminology) is a member of more than one Object group, a subject is granted a right to that object instance if any of the instance's Object Groups grants him the right (thus, in Table 6 below, if an instance obj__3 were a member of both objGp1 and objGp2, subject alice would be granted the "x" right to obj__3).

TABLE 6

Object Group Memberships

| objects | obj__1, obj__8, obj__n | obj__1, obj__5, obj__12 |
|---|---|---|
| Object Group | objGp1 | objGp2 |

(Note that in Table 6, all object instances are members of only one Object Group; also, object instance may belong to multiple Object Groups). Object grouping can reduce the size of the authorization matrix vary substantially, since some systems may contain many thousands (or perhaps millions!) of object instances in a system. Table 7 continues the example and illustrates how Object Groups can reduce the column-dimension of a system's access matrix.

TABLE 7

Revised Access Matrix (with Object Groups)

|  |  |  |  |
|---|---|---|---|
|  |  | rwx | rw- |
|  |  | r-- | r-- |
|  |  | rwx | --- |

In a system with a million objects and 50 subject entries (users and groups appearing in the access matrix), if no object grouping is permitted, the storage required will be:

1,000,000 * 50 * sizeof (cell) // for cells+1,000,000 * sizeof (objectname) // for labels Since 1,000,000 unique object-names can be represented in 20 bits, assuming 10 bits to represent the rights in a cell, this amounts to 520,000,000 bits, or about 65 million bytes.

On the other hand, if object grouping is permitted, and if only 500 object groups need to be defined (500 is a lot!), the storage required will be:

500 * 50 * sizeof (cell) // for access matrix cells+1,000,000 * sizeof (objectname) // for objGp membership cells +500 * sizeof (objGpname // for access matrix labels +500 * sizeof (objGpname // for objGpmembership labels Since 1,000,000 unique objectnames can be represented in 20 bits, and 500 object group names can be represented in 9 bits, and assuming 10 bits to represent the rights in a cell as before, this amounts to 20,259,000 bits or about 2.5 million bytes—a factor of 26 reduction! Furthermore, note that the access matrix is a minuscule proportion of the total—only 259,000 bits or about 32K bytes. The large majority of the storage is taken up by the object names in the Object Group membership table. If ObjectGroup membership information is stored only in the object structures themselves, the object names do not need to be stored at all. Instead, the names of Object Groups can be stored in the object structures of which they are members, saving even more storage.

Figure 4:
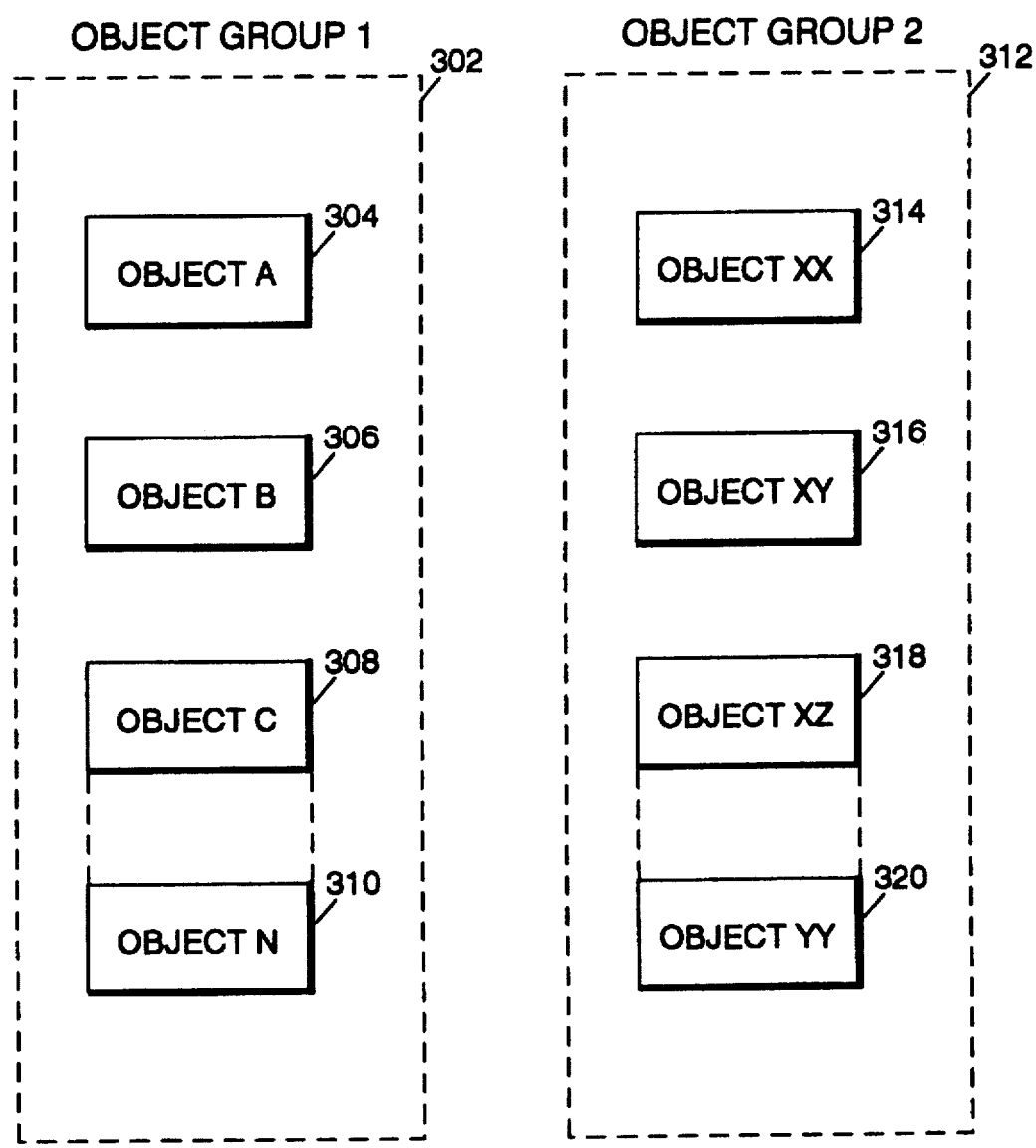
FIG. 4 is a block diagram of plural object groups according to the present invention.

Referring now to FIGS. 4 and 5, grouping of object sharing common access control policies in accordance with the present invention will be further described.

A first group of objects 302 may include a number of objects such as object A304, object B306, object C308 through object N310, while a second group of objects, object group 2, 312, may include objects such as object XX314, object XY316, object XZ318 through object YY320.

The objects are grouped in accordance with access control policies such as is shown in greater detail in FIG. 5. For object group 1, an owner (Alice) is authorized to read, write, and execute relative to any object in object group 1. Users identified as "programmers" are by policy limited to execute only. Users identified as "guests" are limited by policy to read only.

The policies in object group 2 relate to use, administration, and control of access. Again, the owner (Alice) may use, administer, or control the objects in accordance with the policies set forth for object group 2. Programmers may use or control but may not administer in accordance with the policies set forth for object group 2. Guests may use but may not control nor administer.

The criteria for object grouping may vary from one environment to another. In a preferred embodiment of the present invention, each protected class is mapped to an object group. Object instances of a given class belong to the same object group. Thus, object membership in object groups also becomes implicit and does not need further management as methods are available to retrieve the class of an object and hence its object group. As protection of a particular object is required, an object group is created to handle the security for the object group.

Initially, a single object group may be generated with additional object groups created as the number of objects grows and additional groups are required.

By using object groups, application developers and security administrators need to deal with fewer protected entities. This facilitates the administrative tasks and provides for efficient object access control.

Object grouping effectively reduces the size of the access matrix as object group 1 and object group 2 each may contain a large number of objects.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:
   one or more processors;
   a memory system;
   one or more I/O controllers, each controlling one or more I/O devices;
   a bus connecting the processors, the memory system and the I/O controllers;
   an operating system controlling operation of the processors, the memory system and the I/O controllers; and
   an object oriented control means comprising:
   means for creating one or more groups of objects, the objects in each object group sharing a common access control policy, wherein each group contains objects from one or more object classes;
   means for associating each object group with one or more access matrixes wherein each access matrix is stored separately from each object; and
   means for accessing objects from an object group based on an associated access matrix.

2. An information handling system, according to claim 1, further comprising:
   means for creating a first object group of objects sharing common access control policies at a system initalization time, wherein the objects in the first group are from one or more object classes.

3. An information handling system, according to claim 1, further comprising:
   means for creating additional object groups of objects as additional objects sharing common access control policies are created, wherein the objects in the additional groups are from one or more object classes.

4. An information handling system, according to claim 1, further comprising:
   means for creating one or more access matrixes to control implementation of a system authorization policy.

5. A method for improving efficiency of an information handling system employing object oriented technology, comprising the steps of:
   creating one or more groups of objects the objects in each object group sharing a common access control policy, wherein each group contains objects from one or more object classes;
   associating each object group with one or more access matrixes wherein each access matrix is stored separately from each object; and
   accessing objects from an object group based on an associated access matrix.

6. A method according to claim 5, further comprising the step of:
   associating an object with a plurality of object groups.

7. A method according to claim 5, wherein said step of creating one or more groups of objects further comprises:
   creating a first group of objects sharing common access control policies, wherein the first group contains objects from one or more object classes, and wherein the first group is created at system initialization time; and
   creating one or more additional groups of objects sharing common access control policies, wherein each group contains objects from one or more object classes, and wherein the additional groups are created as additional objects sharing common access control policies are created.

8. A method according to claim 5, further comprising the step of:
   creating one or more access matrixes to control implementation of a system authorization policy.

9. A computer readable medium, comprising:
   means for creating one or more groups of objects, the objects in each object group sharing a common access control policy, wherein each group contains objects from one or more object classes;
   means for associating each object group with one or more access matrixes wherein each access matrix is stored separately from each object; and
   means for accessing objects from an object group based on an associated access matrix.

10. A computer readable medium, according to claim 9, further comprising:
    means for associating an object with a plurality of object groups.

11. A computer readable medium according to claim 9, wherein said means for creating one or more groups of objects further comprises:
    means for creating a first group of objects sharing common access control policies, wherein the first group contains objects from one or more object classes, and wherein the first group is created at system initialization time; and
    means for creating one or more additional groups of objects sharing common access control policies, wherein each group contains objects from one or more object classes, and wherein the additional groups are created as additional objects sharing common access control policies are created.

12. A computer readable medium according to claim 9, further comprising:
    means for creating one or more access matrixes to control implementation of a system authorization policy.

* * * * *

UNITED STATES PATENT AND TRADEMARK OFFICE
CERTIFICATE OF CORRECTION

PATENT NO : 5,787,427
DATED : Jul. 28, 1998
INVENTOR(S) : Benantar

It is certified that error appears in the above-identified patent and that said Letters Patent is hereby corrected as shown below:

Col. 2, line 18: delete "08/537,647" and insert --08/537,648--.

Signed and Sealed this

Ninth Day of February, 1999

Attest:

Attesting Officer

*Acting Commissioner of Patents and Trademarks*